United States Patent
Yamaoka et al.

(10) Patent No.: US 7,016,158 B2
(45) Date of Patent: Mar. 21, 2006

(54) RECORDING MEDIUM DRIVE

(75) Inventors: Nobuyoshi Yamaoka, Kawasaki (JP); Akira Ueda, Kawasaki (JP); Toshiyuki Nakada, Kawasaki (JP); Masao Kondo, Kawasaki (JP); Keishi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 178 days.

(21) Appl. No.: 10/351,081

(22) Filed: Jan. 24, 2003

(65) Prior Publication Data
US 2004/0021988 A1 Feb. 5, 2004

(30) Foreign Application Priority Data
Aug. 2, 2002 (JP) ........................ 2002-226231

(51) Int. Cl.
*G11B 5/48* (2006.01)

(52) U.S. Cl. .................................... 360/266.3
(58) Field of Classification Search ............. 360/244.1, 360/97.01, 245.5, 97.02, 245.9, 266.3
See application file for complete search history.

(56) References Cited

U.S. PATENT DOCUMENTS

| | | | | |
|---|---|---|---|---|
| 4,891,723 A | * | 1/1990 | Zak | 360/245.9 |
| 5,923,501 A | | 7/1999 | Suzuki et al. | 360/106 |
| 5,995,321 A | | 11/1999 | Ishida | 360/97.01 |
| 6,084,746 A | * | 7/2000 | Shiraishi et al. | 360/244.1 |
| 6,144,530 A | * | 11/2000 | Shiraishi et al. | 360/244.1 |
| 6,339,519 B1 | * | 1/2002 | Nomura et al. | 360/244.1 |
| 6,498,702 B1 | * | 12/2002 | Shimizu et al. | 360/244.1 |
| 6,549,373 B1 | * | 4/2003 | Shiraishi et al. | 360/244.1 |
| 6,639,757 B1 | * | 10/2003 | Morley et al. | 360/245.9 |
| 6,687,094 B1 | * | 2/2004 | Liu et al. | 360/265.7 |
| 2001/0006440 A1 | * | 7/2001 | Noda | 360/97.01 |

* cited by examiner

*Primary Examiner*—A. J. Heinz
*Assistant Examiner*—Mark Blouin
(74) *Attorney, Agent, or Firm*—Greer, Burns & Crain, Ltd.

(57) ABSTRACT

A head slider is related to an actuator block. A flexible printed circuit board is received on the surface of the actuator block. A head IC is mounted on the surface of the flexible printed circuit board. A heat conductive member is mounted on the head IC. The heat resistance of the heat conductive member is set smaller than that of the flexible printed circuit board. A larger amount of heat can be transmitted from the head IC to the actuator block. The actuator block is made of a metal material such as aluminum. The heat resistance of the actuator block is apparently smaller than that of the flexible printed circuit board. A larger amount of heat can be radiated from the actuator block as compared with the flexible printed circuit board. The head IC is thus reliably prevented from a rise in the temperature.

11 Claims, 2 Drawing Sheets

RECORDING MEDIUM DRIVE

BACKGROUND OF THE INVENTION

1. Field of the Invention

The present invention relates to a recording medium drive managing information in a recording medium such as a magnetic recording disk, for example. In particular, the invention relates to a recording medium drive including: an actuator block supported on a support shaft for rotation; a head slider opposed to a recording medium; a flexible printed circuit board at least partly received on the surface of the actuator block; and a head IC (Integrated Circuit called "preamp") chip mounted on the surface of the flexible printed circuit board.

2. Description of the Prior Art

A read head element and/or a write head element are mounted on a head slider in a hard disk drive (HDD), for example. The read and write head elements are designed to receive electric signals from a head IC chip, for example. An increased speed of data transmission requires a higher frequency of the electric signals. As the frequency of the electric signals gets higher, the head IC chip tends to suffer from generation of a larger amount of heat. A rise in the temperature of the head IC chip should sufficiently be avoided.

A heat sink, which may include heat radiation fins, is in general used to suppress a rise in the temperature of an IC chip as well as a printed circuit board in electronic devices including desktop computers, for example. The heat sink is mounted on the surface of the IC chip. The heat sink serves to increase the exposed area for promoted heat radiation. Moreover, when a ventilation fan is combined with the heat sink, the rise of the temperature may be suppressed in the IC chip in a still further efficient manner.

However, the aforementioned head IC chip should be incorporated within the enclosure of the HDD. The head IC chip should be located within a limited space. Any heat sink mounted on the head IC chip is hardly located within the limited space. In addition, a ventilation fan cannot be used within the closed enclosure of the HDD. The generated airflow tends to hinder stable operations of the read and write head elements within the enclosure of the HDD.

SUMMARY OF THE INVENTION

It is accordingly an object of the present invention to provide a recording medium drive reliably contributing to suppression of a rise in the temperature of a head IC in an efficient manner.

According to first aspect of the present invention, there is provided a recording medium drive comprising: an actuator block supported on a support shaft for rotation and having the heat resistance of a first value; a head slider connected to the actuator and opposed to a recording medium; a flexible printed circuit board having the heat resistance of a second value larger than the first value, at least part of the flexible printed circuit board received on the surface of the actuator block; a head IC mounted on the surface of the flexible printed circuit board; and a heat conductive member extending from the surface of the head IC to the surface of the actuator block and having the heat resistance of a third value smaller than at least the second value.

When the flexible printed circuit board is received on the surface of the actuator block, the flexible printed circuit board is interposed between the head IC and the actuator block. In general, the flexible printed circuit board includes a resin film extending between the head IC and the actuator block. The flexible printed circuit board inevitably hinders heat exchange between the head IC and the actuator block.

On the other hand, the heat conductive member serves to interconnect the head IC and the actuator block irrespective of the aforementioned interposal of the flexible printed circuit board. Since the heat resistance of the heat conductive member is set smaller than that of the flexible printed circuit board, a larger amount of heat can be transmitted through the heat conductive member as compared with the flexible printed circuit board. The heat conductive member serves to reliably establish an efficient transmission of heat from the head IC to the actuator block.

In general, the actuator block is made of a metal material such as aluminum. The heat resistance of the actuator block can be set smaller than that of the flexible printed circuit. Accordingly, the actuator block is expected to radiate a larger amount of heat as compared with the flexible printed circuit board. The head IC is reliably prevented from a rise in the temperature in this manner.

Here, the heat conductive member may include a metal plate contacting the surface of the head IC, and a metal screw penetrating through the flexible printed circuit board so as to bind the metal plate with the actuator block. The metal plate and the metal screw may be made of aluminum, for example. It should be noted that the heat conductive member may be made of a material other than metal.

Alternatively, the heat conductive member may include a metal plate providing a bottom layer of the flexible printed circuit board. Specifically, the metal plate may touch the head IC. Since the back surface of the metal plate is received on the exposed surface of the actuator block, the metal plate serves to thermally interconnect the head IC and the actuator block.

According to a second aspect of the present invention, there is provided a recording medium drive comprising: an actuator block supported on a support shaft for rotation and having the heat resistance of a first value; a head slider connected to the actuator and opposed to a recording medium; a flexible printed circuit board having the heat resistance of a second value larger than the first value, the flexible printed circuit board defining a contact surface for contacting the surface of the actuator block; a head IC mounted on the contact surface of the flexible printed circuit board and disposed in a recess defined in the actuator block; and a heat conductive material interposed between the surface of the head IC and the surface of the actuator block and having the heat resistance of a third value smaller than at least the second value.

When the flexible printed circuit board is received on the surface of the actuator block, the head IC is allowed to get opposed to the surface of the actuator block. The head IC can be connected to the actuator block through a heat conductive material such as a thermal compound without hindrance of the flexible printed circuit board. A larger amount of heat can be transmitted from the head IC to the actuator block through the heat conductive material.

The actuator block is made of a metal material such as aluminum, for example. Since the heat resistance of the actuator block can be set smaller than that of the flexible printed circuit, the actuator block is expected to radiate a larger amount of heat as compared with the flexible printed circuit board. The head IC is reliably prevented from a rise in the temperature in this manner In a conventional technique, when the flexible printed circuit board is received on the surface of the actuator block, the flexible printed circuit board is interposed between the head IC and the actuator block. The flexible printed circuit board includes a resin film extending between the head IC and the actuator block. The flexible printed circuit board inevitably hinders heat exchange between the head IC and the actuator block. The head IC tends to suffer from a rise in the temperature.

The aforementioned heat conductive member as well as the actuator block may be incorporated in any types of a recording medium drive including a hard disk drive (HDD), any types of an electronic device, and the like, even when all of those suffer from a closed limited space and restriction to a forced ventilation. The recording medium drive may include any types of a storage device managing information in a corresponding storage medium.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
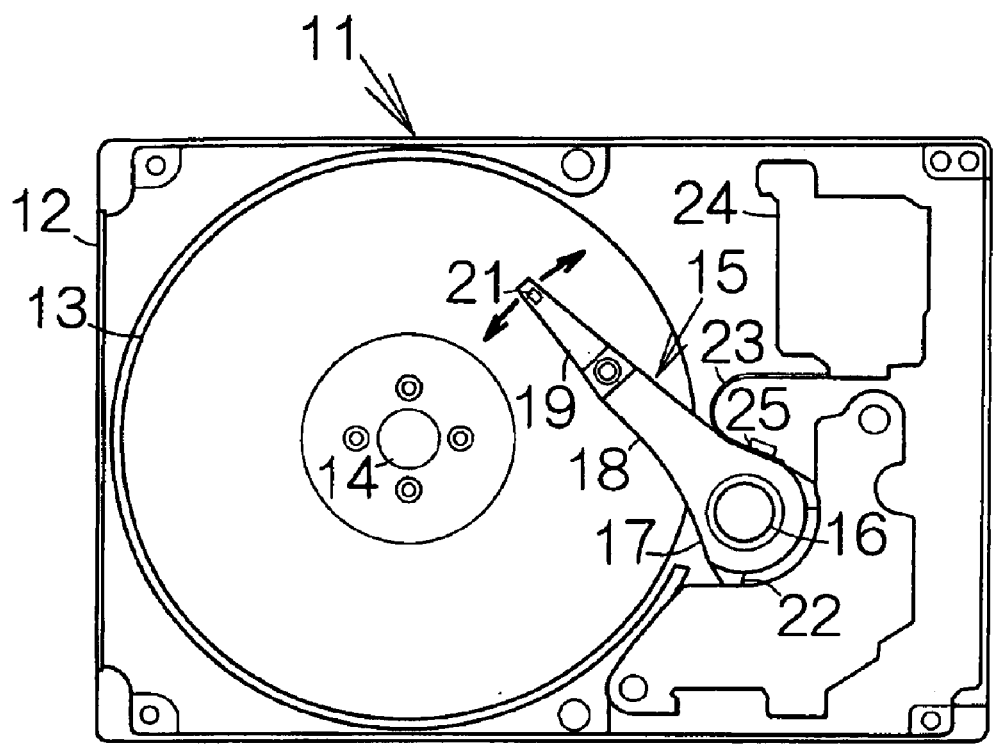
FIG. 1 is a plan view schematically illustrating the inner structure of a hard disk drive (HDD) as an example of a magnetic recording medium drive.

FIG. 1 schematically illustrates the inner structure of a hard disk drive (HDD) 11 as an example of a recording medium drive or storage device. The HDD 11 includes a box-shaped primary enclosure 12 defining an inner space of a flat parallelepiped, for example. At least one magnetic recording disk 13 is accommodated in the inner space within the primary enclosure 12. The magnetic recording disk 13 is mounted on the driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the primary enclosure 12 so as to define the closed inner space between the primary enclosure 12 and itself.

A head actuator 15 is also incorporated within the inner space of the primary enclosure 12. The head actuator 15 includes an actuator block 17 supported on a vertical support shaft 16 for rotation. Rigid actuator arms 18 are defined in the actuator block 17. The actuator arms 18 are designed to extend in a horizontal direction from the vertical support shaft 16. The actuator arms 18 are associated with the front and back surfaces of the magnetic recording disk or disks 13, respectively. The actuator block 17 may be made of aluminum. Molding process may be employed to form the actuator block 17.

Elastic head suspensions 19 are fixed to the tip ends of the actuator arms 18. The individual head suspension 19 is designed to extend forward from the corresponding tip end of the actuator arm 18. As conventionally known, a flying head slider 21 is supported on the front end of the individual head suspension 19. The flying head sliders 21 are related to the actuator block 17 in this manner. The flying head sliders 21 are opposed to the surfaces of the magnetic recording disk or disks 13.

An electromagnetic transducer, not shown, is mounted on the flying head slider 21. The electromagnetic transducer may include a read element such as a giant magnetoresistive (GMR) element or a tunnel-junction magnetoresistive (TMR) element, and a write element such as a thin film magnetic head. The GMR or TMR element is designed to discriminate magnetic bit data on the magnetic recording disk 13 by utilizing variation in the electric resistance of a spin valve film or a tunnel-junction film. The thin film magnetic head is designed to write magnetic bit data into the magnetic recording disk 13 by utilizing a magnetic field induced at a thin film coil pattern.

The head suspension 19 serves to urge the flying head slider 21 toward the surface of the magnetic recording disk 13. When the magnetic recording disk 13 rotates, the flying head slider 21 is allowed to receive airflow generated along the rotating magnetic recording disk 13. The airflow serves to generate a lift on the flying head slider 21. The flying head slider 21 is thus allowed to keep flying above the surface of the magnetic recording disk 13 during the rotation of the magnetic recording disk 13 at a higher stability established by the balance between the lift and the urging force of the head suspension 19.

A power source 22 such as a voice coil motor (VCM) is connected to the tail of the actuator block 17. The power source 22 drives the actuator block 17 for rotation around the support shaft 16. The rotation of the actuator block 17 induces the swinging movement of the actuator arms 18 and the head suspensions 19. When the actuator arm 18 is driven to swing about the support shaft 16 during the flight of the flying head slider 21, the flying head slider 21 is allowed to cross the recording tracks defined on the magnetic recording disk 13 in the radial direction of the magnetic recording disk 13. This radial movement serves to position the flying head slider 21 right above a target recording track on the magnetic recording disk 13. As conventionally known, in the case where two or more magnetic recording disks 13 are incorporated within the inner space of the primary enclosure 12, a pair of the elastic head suspensions 19 and the actuator arms 18 are disposed between the adjacent magnetic recording disks 13.

A flexible printed circuit board 23 is also incorporated within the inner space of the primary enclosure 12. The end of the flexible printed circuit board 23 is received on the surface of the actuator block 17. The other end of the flexible printed circuit board 23 is connected to a controller board 24 likewise incorporated within the inner space of the primary enclosure 12. The controller board 24 is electrically connected to a printed circuit board, not shown, attached to the back surface of the primary enclosure 12, for example. The controller board 24 and a controller circuit established on the printed circuit board serve to manage the operation of the HDD 11.

A head IC chip 25 is mounted on the surface of the flexible printed circuit board 23. The head IC chip 25 is electrically connected to the read element as well as the write element on the flying head slider 21. A conductive wiring pattern, not shown, extending over the surface of the head suspension 19 is utilized to establish the electric connection. A predetermined signal controlling circuit is established on the head IC chip 25. The signal controlling circuit generates read signals based on the variation in the read element and write signals supplied to the write element.

Figure 2:
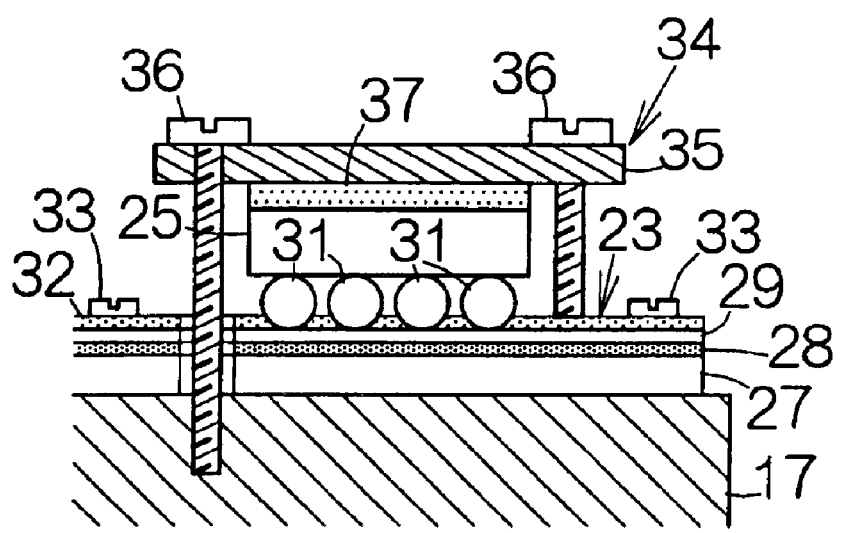
FIG. 2 is an enlarged partial sectional view of an actuator block and a flexible printed circuit board for schematically illustrating a head IC chip and a heat conductive member according to a first embodiment of the present invention.

As shown in FIG. 2, the flexible printed circuit board 23 includes a plate 27, made of aluminum, having a thickness ranging from 100 μm to 1,000 μm, for example. The plate 27 is designed to provide the bottom or lowest layer of the flexible printed circuit board 23. When the flexible printed circuit board 23 is superposed on the surface of the actuator block 17, the back surface of the plate 27 is allowed to uniformly contact the surface of the actuator block 17.

An insulating film 28, made of resin, having a thickness ranging from 20 μm to 40 μm is bonded to the surface of the plate 27. An adhesive may be employed to bond the insulating film 28 to the plate 27. A predetermined wiring pattern 29 is formed to extend over the surface of the insulating film 28. The wiring pattern 29 may be made based on a copper film of approximately 20 μm thickness adhered to the surface of the insulating film 28. Wet etching process may be employed to form the wiring pattern 29, for example. An insulating layer, including the adhesive made of resin, of approximately 80 μm thickness is established between the wiring pattern 29 and the plate 27 in this manner. The insulating layer serves to completely inhibit an electric connection between the wiring pattern 29 and the plate 27. The insulating layer also serves to increase the heat resistance of the flexible printed circuit board 23. In general, the flexible printed circuit board 23 is allowed to have a heat resistance remarkably larger than that of the actuator block 17 made of aluminum.

The head IC chip 25 is connected to the wiring pattern 29. Spherical terminals 33 are utilized to connect the head IC chip 25 to the wiring pattern 29, for example. The spherical terminals 31 may be made of gold, solder, or the like. The spherical terminals 31 may be embedded within a so-called underfill resin between the flexible printed circuit board 23 and the head IC chip 25. The wiring pattern 29 is covered with a protection film 32 made of resin. As is apparent from FIG. 2, screws 33 may be employed to fix the flexible printed circuit board 23 to the actuator block 17, for example.

A heat conductive member 34 according to a first embodiment of the present invention is mounted on the head IC chip 25. The heat conductive member 34 includes a metal plate 35 received on the upper surface of the head IC chip 25, and metal screws 36 penetrating through the flexible printed circuit board 23 so as to bind the metal plate 35 with the actuator block 17. A thermal compound 37 is interposed between the metal plate 35 and the head IC chip 25. The thermal compound 37 may be made of a conventional chemical compound. As conventionally known, the thermal compound 37 serves to promote heat exchange between the head IC chip 25 and the metal plate 35.

The metal plate 35 as well as the metal screws 36 may be made of aluminum in the same manner as the actuator block 17, for example. Since the heat resistance of the metal plate 35 and the metal screws 36 are remarkably smaller than that of the flexible printed circuit board 23, the metal plate 35 and the metal screws 36 in cooperation serve to establish a path of an efficient heat conductivity between the head IC chip 25 and the actuator block 17. The heat of the head IC chip 25 is efficiently transmitted to the actuator block 17. The actuator block 17 is allowed to radiate heat over a larger exposed area or surface as compared with the sole metal plate 35. The head IC chip 25 is reliably prevented from a rise in the temperature. The present inventors have demonstrated the utility of the heat conductive member 34 based on a computer software simulation. It has been confirmed that the heat conductive member 34 reliably prevents a rise in the temperature of the head IC chip 25.

Figure 3:
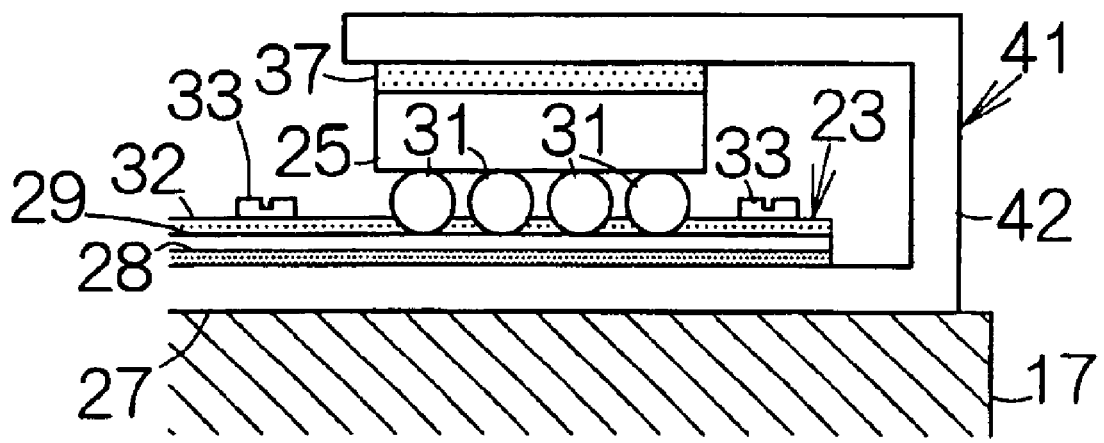
FIG. 3 is an enlarged partial sectional view, corresponding to FIG. 2, of the actuator block and a flexible printed circuit board for schematically illustrating the head IC chip and a heat conductive member according to a second embodiment of the present invention.

FIG. 3 schematically illustrates a heat conductive member 41 according to a second embodiment of the present invention. The heat conductive member 41 includes the plate 27 serving as the bottom or lowest layer of the flexible printed circuit board 23. Specifically, an extension 42 of the plate 27 is formed continuous to the flexible printed circuit board 23 in this second embodiment. The insulating film 28, the wiring pattern 29 and the protection film 32 are completely removed from the surface of the extension 42. The surface of the extension 42 is allowed to get exposed. The extension 42 is folded to reach the upper surface of the head IC chip 25. The thermal compound 37 is allowed to exhibit the grab for fixing the extension 42 to the head IC chip 25. Like reference numerals are attached to structures or components identical to those of the aforementioned first embodiment.

Since the heat resistance of the plate 27 and the extension 42 are remarkably smaller than that of the flexible printed circuit board 23, the plate 27 and the extension 42 serve to establish a path of an efficient heat conductivity between the head IC chip 25 and the actuator block 17. The heat of the head IC chip 25 is efficiently transmitted to the actuator block 17. The head IC chip 25 is reliably prevented from a rise in the temperature. The present inventors have likewise demonstrated the utility of the heat conductive member 41 based on a computer software simulation. It has been confirmed that the heat conductive member 41 reliably prevents a rise in the temperature of the head IC chip 25.

Figure 4:
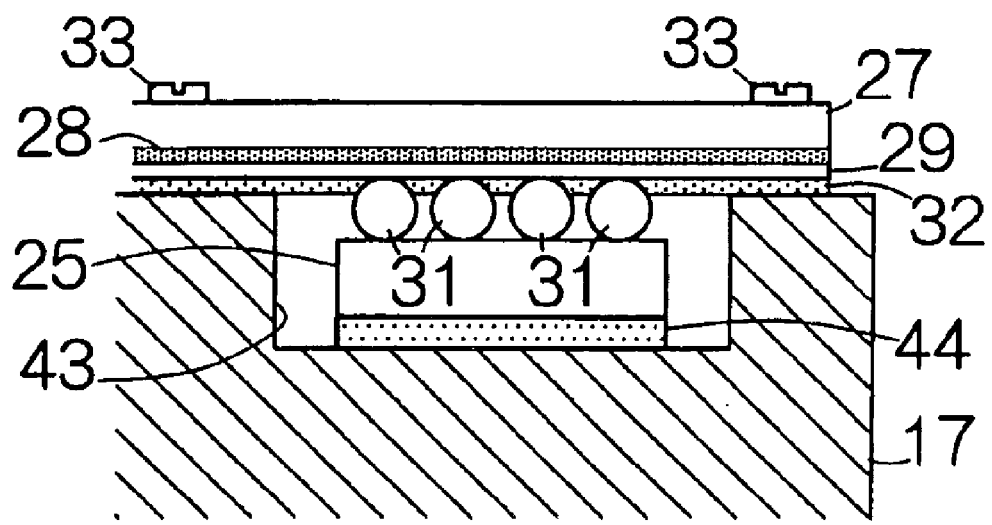
FIG. 4 is an enlarged partial sectional view, corresponding to FIG. 2, of the actuator block and a flexible printed circuit board for schematically illustrating the head IC chip and a heat conductive mechanism according to a third embodiment of the present invention.

Otherwise, the flexible printed circuit board 23 may be reversed when it is fixed to the actuator block 17, as shown in FIG. 4. Specifically, a front contact surface of the flexible printed circuit board 23 is allowed to contact the exposed surface of the actuator block 17. The head IC chip 25 is mounted on the contact surface of the flexible printed circuit board 23. When the flexible printed circuit board 23 is superposed on the actuator block 17, the head IC chip 25 is received in a recess 43 defined in the actuator block 17. A thermal compound 44 as a heat conductive material is interposed between the head IC chip 25 and the actuator block 17 within the recess 43. Like reference numerals are attached to structures or components identical to those of the aforementioned embodiments.

The head IC chip 25 is opposed to the surface of the actuator block 17. The head IC chip 25 is coupled to the actuator block 17 through the thermal compound 44. The heat of the head IC chip 25 is efficiently transmitted to the actuator block 17. The head IC chip 25 is reliably prevented from a rise in the temperature. The present inventors have likewise demonstrated the utility of the above-described structure based on a computer software simulation.

The aforementioned heat conductive member 34, 41 as well as the actuator block 17 may be applied to the aforementioned hard disk drive (HDD), any types of a recording medium drive, any types of an electronic device, and the like, even when all of those suffer from a closed limited space and restriction to a forced ventilation. The recording medium drive may include any types of a storage device managing information in a corresponding storage medium.

What is claimed is:

1. A recording medium drive comprising:
   an actuator block supported on a support shaft for rotation and having a heat resistance of a first value;
   a head slider connected to the actuator block and opposed to a recording medium;
   a flexible printed circuit board having a heat resistance of a second value larger than the first value, at least part of the flexible printed circuit board received on a surface of the actuator block;

a head IC mounted on a surface of the flexible printed circuit board; and a heat conductive member extending from a surface of the head IC to the surface of the actuator block and having a heat resistance of a third value smaller than at least the second value; and a heat conductive material interposed between the surface of the head IC and the heat conductive member and having a heat resistance of a fourth value smaller than at least the second value.

2. The recording medium drive according to claim 1, wherein said heat conductive member includes a metal plate contacting the surface of the head IC, and a metal screw penetrating through the flexible printed circuit board so as to bind the metal plate with the actuator block.

3. The recording medium drive according to claim 2, wherein said flexible printed circuit board includes a resin film extending between the head IC and the actuator block.

4. The recording medium drive according to claim 3, wherein said actuator block is made of aluminum.

5. The recording medium drive according to claim 1, wherein said heat conductive member includes a metal plate providing a bottom layer of the flexible printed circuit board.

6. The recording medium drive according to claim 5, wherein said flexible printed circuit board includes a resin film extending between the head IC and the actuator block.

7. The recording medium drive according to claim 6, wherein said actuator block is made of aluminum.

8. A recording medium drive comprising:

an actuator block supported on a support shaft for rotation and having a heat resistance of a first value;

a head slider connected to the actuator block and opposed to a recording medium;

a flexible printed circuit board having a heat resistance of a second value larger than the first value, a contact surface of the flexible printed circuit board contacting a surface of the actuator block;

a head IC mounted on the contact surface of the flexible printed circuit board and disposed in a recess defined in the actuator block; and a heat conductive material interposed between a surface of the head IC and the surface of the actuator block and having a heat resistance of a third value smaller than at least the second value.

9. The recording medium drive according to claim 8, wherein said flexible printed circuit board includes a resin film.

10. The recording medium drive according to claim 8, wherein said actuator block is made of aluminum.

11. A recording medium drive comprising:

an actuator block supported on a support shaft for rotation and having a heat resistance of a first value;

a head slider connected to the actuator and opposed to a recording medium;

a flexible printed circuit board having a heat resistance of a second value larger than the first value, at least part of the flexible printed circuit board received on a surface of the actuator block;

a head IC mounted on a surface of the flexible printed circuit board and having an exposed upper surface; and a heat conductive member extending from the exposed upper surface of the head IC to the surface of the actuator block and having a heat resistance of a third value smaller than at least the second value.

* * * * *

UNITED STATES PATENT AND TRADEMARK OFFICE
CERTIFICATE OF CORRECTION

PATENT NO. : 7,016,158 B2 Page 1 of 1
DATED : March 21, 2006
INVENTOR(S) : Nobuyoshi Yamaoka It is certified that error appears in the above-identified patent and that said Letters Patent is hereby corrected as shown below:

<u>Column 7,</u>
Line 2, delete "board; and" and insert -- board; --.

Signed and Sealed this

Sixth Day of June, 2006

JON W. DUDAS
*Director of the United States Patent and Trademark Office*